Patented May 26, 1942

2,284,554

UNITED STATES PATENT OFFICE 2,284,554

CONDENSATION CATALYSTS OF INCREASED ACTIVITY AND PROCESS OF PRODUCING THE SAME

Fred J. Beyerstedt, Plainfield, N. J., assignor to Standard Oil Development Company, a corporation of Delaware No Drawing. Application August 3, 1940, Serial No. 351,250

10 Claims. (Cl. 196—10)

The invention relates to a process for increasing the activity of boron trifluoride-water catalysts which are either partially spent or are substantially completely diminished in activity to a point where their intended usefulness has become seriously impaired. More particularly, the invention relates to a process of increasing the activity of boron trifluoride-water catalysts in which the original catalyst composition constituted a substantially saturated aqueous solution of boron trifluoride and in which it is desired to substantially completely remove all of the boron trifluoride or its equivalent chemical components in the catalyst composition in order to increase the activity of the catalyst and make it desirable for reuse in an organic condensation reaction.

In a more specific sense the invention has reference to a method of increasing the activation of a spent or partially spent organic condensation catalyst of boron trifluoride and water which has been employed in organic condensation reactions to accelerate the same, as, for example, the alkylation of isoparaffins with olefins, the alkylation of aryls with olefins, the polymerization and copolymerization of the various lower molecular weight mono- and di-olefins including acetylene and various other types of organic condensation reactions.

As disclosed above and as is evident from the prior art, the use of boron trifluoride-water compositions as catalysts in various reactions is well known. However, it is likewise well known that upon continued usage of such catalyst compositions it becomes necessary to either reform the catalyst, that is, by separating the chemical components of the catalyst and reuniting the same to reform a fresh catalyst composition, or to in some other manner increase the activity of the original deactivated catalyst composition so as to make the same useful to a further extent in various types of organic condensation reactions. Such reactivation processes are practically essential to a continuous commercial organic condensation process employing such catalysts. The economics of such processes demand that the catalyst be utilized to the fullest extent if such processes are to operate successfully on a commercial scale. For example, in the alkylation of isoparaffins with normally gaseous mono-olefins a substantially completely saturated boron fluoride aqueous solution has previously been employed. After operating with the same catalyst mass for a period of about 15 hours it was found that the catalytic activity of the mass depreciated to some extent. However, upon the introduction of a small quantity of boron trifluoride to the catalyst mass the activity was restored to about the original activity of the catalyst mass. However, the activity of this mass which had been rejuvenated by the introduction of small amounts of boron trifluoride became deactivated much more quickly than did the original mass, and upon the introduction of further amounts of boron trifluoride to this mass the original activity was not quite attainable, but here again the activity of the catalyst fell off considerably faster than did the preceding catalyst mass so that eventually the activity of the catalyst mass became extremely short-lived, so much so that it became impractical to attempt to restore activity of the catalyst by adding small amounts of boron trifluoride to the catalyst mass during the reaction. It is thought that the reason for the ultimate deactivation of the boron trifluoride-water catalyst is brought about by the increasing amounts of hydrocarbon by-products which became built up by absorption or some other mechanism which at present is not clearly understood, to the point where the boron trifluoride-water or its ensuing chemical compounds became contaminated or poisoned by the hydrocarbon component of the catalyst mixture. The present process is designed to increase the activity of such a catalyst mass either after it has become substantially completely deactivated with respect to the reaction in which it is employed or after it has become partially deactivated by reason of such reaction catalysis.

One object of the present invention has been to devise a method whereby it is possible to reutilize boron trifluoride-water organic condensation catalyst compositions having decreased activity or being completely deactivated by subjecting such catalyst compositions to a process for increasing the activity of these compositions without the necessity of totally destroying the same by breaking the composition up into its component compounds with the attendant necessity of reforming the catalyst composition anew. The present process is designed to reactivate or increase the activity of catalyst compositions of the above specified type without of necessity reforming the catalytic compounds completely.

Another object of the invention has been to increase the activity of boron trifluoride-water compositions of decreased activity or complete inactivity so far as promoting organic condensation reactions is concerned, and in particular have these compositions contain at least 55% by weight of boron trifluoride or the chemical equivalent thereof by volatilizing boron trifluoride from the catalyst mass treated only to such an extent that the catalyst composition stratifies or separates into layers whereby it is possible to remove the hydrocarbon layer and re-introduce boron trifluoride into the catalyst layer to thereby prepare the catalyst for reuse in the same or other similar organic condensation reactions.

Another object of the invention has been the discovery that these catalyst compositions which have been increased in activity by the process of the invention are unexpectedly useful in promoting the various organic condensation reactions in that the yields of the desired products are increased over and above the yields of the fresh catalyst or the catalyst of decreased activity.

Another object of the invention is to apply the process hereinafter to be disclosed more particularly to the treatment of boron trifluoride-water catalyst compositions of diminished activity in which the type of catalyst treated is one containing predominating amounts of boron trifluoride or the resulting equivalent chemical compositions when contacted with water.

A still further object of the invention has been to produce a catalyst composition which in and of itself has been found to be novel and to produce new and unobvious results when used to activate organic condensation reactions.

The objects of the invention as well as other objects and advantages of the invention which will hereinafter be apparent have been accomplished through the treatment of boron fluoride-water organic condensation catalyst compositions of partially or completely reduced activity by volatilizing boron trifluoride from the said catalyst composition with sufficient care and to such an extent that only boron trifluoride is volatilized from the catalyst composition and then only to the extent that will enable a phase separation to take place. Once the catalyst composition has stratified or separated into two phases, the removal of boron trifluoride from the mixture is stopped. The phases are separated into a catalyst phase and a hydrocarbon phase and the catalyst phase is then treated with additional quantities of boron trifluoride and the catalyst is ready for reuse as an organic condensation catalyst. It is ordinarily undesirable to volatilize off more boron trifluoride than is absolutely necessary for the reason that ordinarily the boron trifluoride is volatilized off by the application of heat to the catalyst of diminished activity under substantially constant pressures and in the event that the temperature exceeds about 300° F. the boron trifluoride remaining in the catalyst composition tends to excessively char and carbonize the organic matter present in the catalyst mixture to such an extent that extensive decomposition occurs. This is undesirable both because of the fact that additional quantities of boron trifluoride are decomposed by reason of the carbonizing or charring and by reason of the fact that the residue left from such a reaction is difficult to remove and often tends to become expensive to eliminate from the reaction zone. If desired, the catalyst need not be completely spent in character before the reactivation process is employed. In fact, it is preferable to subject the catalyst to reactivation while it is still active as an organic condensation catalyst since apparently the reactivation process lends beneficial characteristics to the resultant reactivated catalyst which the original catalyst did not possess even in its fresh state.

It has previously been known that a catalyst composed of about 78 weight % of boron fluoride and about 22 weight % of water, or the chemical equivalents of these components, when combined is an excellent alkylation catalyst. However, eventually the catalyst becomes spent to a point where introduction of small quantities of boron fluoride only momentarily increase its activity. Such a catalyst when subjected to the process of the present invention may be treated so as to volatilize off all of the remaining boron trifluoride of the catalyst composition to the extent that the separation into phases occurs when the catalyst composition is found to contain about 60% by weight of boron fluoride and about 40% by weight of water with extremely small traces of hydrocarbon remaining. This, of course, represents a volatilization of boron trifluoride at atmospheric pressure. On the other hand, if it is desired or if it is necessary in order to obtain a separation of the catalyst composition into a hydrocarbon phase and a catalyst phase, sub-atmospheric pressures may be employed, in which case the ultimate catalyst composition will be somewhat below 60% by weight of boron trifluoride. In such cases the composition may be reduced to as much as 55% by weight of boron trifluoride or even as low as 40% by weight of boron trifluoride with the remainder of the catalyst layer constituting water as such or chemically combined with boron trifluoride.

In dealing with the use of substantially completely saturated boron trifluoride-water solutions as catalyst compositions, it should be borne in mind that not only does the catalyst become deactivated by reason of its retaining contaminants or poisons which are built up by reason of the reaction which it is catalyzing but also the activity of the catalyst becomes diminished during reaction by reason of the fact that the catalyst is a saturated solution of boron trifluoride, a normally gaseous material, and that during the reaction the boron trifluoride has a tendency to vaporize off of the solution and be carried out with the products of the reaction or normally gaseous materials which are left unreacted in the reaction mixture. This loss of boron trifluoride is also found in the various procedures employed in reactivating the catalyst and handling the same after it has been reactivated. It is, therefore, readily apparent that it is practically impossible to attain a 100% recovery of boron trifluoride and it is practically impossible to attain a 100% effective use of boron trifluoride in a catalyst of the type herein specified. One of the essential principles to be followed in operating the process of the present invention is that in volatilizing off the boron trifluoride from the treated catalyst composition it is necessary to volatilize off sufficient boron trifluoride to effect a separation of the hydrocarbon impurities and contaminants from the catalyst, but at the same time care must be taken to avoid volatilizing off more boron trifluoride than necessary to accomplish this in order to avoid substantial decomposition of the hydrocarbon layer. If it is found for any reason that the hydrocarbon layer is decomposed by reason of the application of heat and the catalyst composition still has not reached the point of stratification, it may then be necessary to employ sub-atmospheric pressures to accomplish the desired result. Usually, however, the separation of phases may be accomplished without the application of sub-atmospheric pressures by simply heating the catalyst gently and gradually raising the temperature to a point not exceeding 300° F. or until a separation of phases occurs.

Various types of spent boron trifluoride-water organic condensation catalyst compositions may be employed as suitable feed stocks for the process of the present invention. Thus, for example, such catalysts when employed in the alkylation of isoparaffins with olefins, in the nuclear alkylation of aromatic compounds with olefins, in the polymerization and copolymerization reactions particularly involving the use of normally gaseous mono- and di-olefins such as isobutylene, normal butylene, butadiene, propylene, ethylene, and even including acetylene, in the esterification of the carboxylic acids with alcohols, in the etherification of alcohols with alkyl halides and the like, in the production of light oils, for example, light lubricating oils, by the use of such catalyst compositions at fairly low temperatures, temperatures not being sufficiently low to solidify the catalyst, and in various other types of reactions, are suitable feed stocks when they become at least partially deactivated before being subjected to the process of the present invention. The invention is not particularly advantageously applicable to the reactivation of boron trifluoride-water catalyst compositions in which the boron trifluoride is present in less than an equivalent of about 55% by weight since it is not possible in such a composition to effect with ease a stratification of the catalyst composition into a hydrocarbon phase and a catalyst phase. Continued heating of such a composition oftentimes results in excessive degradation of the catalyst, presumably with the production of hydrogen fluoride and with the formation of excessive carbonaceous deposits and residues.

The exact nature of the catalyst, either in freshly prepared condition, in its partially deactivated state, in its completely deactivated state or in its reactivated condition, is not known and no theories hereinafter advanced concerning its composition are in any way intended as limitative of the scope of the invention or indicative of the true nature of the catalyst since very little is known concerning the exact chemical composition of these substances. According to "Modern Inorganic Chemistry" by J. W. Mellor, several compounds are formed when boron trifluoride is added to water. One reaction consists in the hydrolysis of part of the boron trifluoride to produce boric acid and hydrogen fluoride. The hydrogen fluoride liberated reacts with the unhydrolyzed boron trifluoride to form $HBF_4$. In addition, boron trifluoride is known to form hydrates with water, such as the monohydrate, dihydrate, etc. It is possible that the actual active catalyst may be one of these compounds or one or more of the compounds which have as yet not been identified. It is also quite possible that the catalyst is actually a solution of boron trifluoride in $HBF_4$ or in one or more of the various hydrates of boron trifluoride.

As previously stated, the temperature employed for evolving boron trifluoride from the deactivated catalyst may range between atmospheric and about 300° F. In some instances, however, the catalyst does not commence to readily evolve boron trifluoride until a temperature of around 110° F. is reached.

Ordinarily, as hereinbefore stated, atmospheric pressure is employed. However, it may be desirable to employ sub-atmospheric pressures for the reasons heretofore stated, especially at the higher temperatures. This not only aids in avoiding hydrocarbon decomposition but it also tends to suppress the formation of hydrogen fluoride. Also, it may be desirable to employ sub-atmospheric pressures and fairly low temperatures to distill off the boron trifluoride and at the same time to distill off any complexes of boron trifluoride which may have been formed with the water present and to then effect a separation of the fluoride from the water complexes thereof and to use the said complexes as a base to which the boron trifluoride is then added to produce a saturated catalyst solution.

The hydrocarbon layer may be separated from the catalyst layer in any suitable and convenient manner. Readily commercial methods of separating the various phases from one another are suitable, for example, the use of settling tanks, centrifuges, and the like.

After the hydrocarbon layer has been once segregated from the catalyst layer, the introduction of boron trifluoride into the catalyst phase is accomplished substantially in the same manner as the boron trifluoride was originally introduced in making up the fresh catalyst composition. Roughly, this is done by maintaining water at room temperature and having bubbled therein boron trifluoride until there is no further change in weight of the solution. Ordinarily the temperature at which this process is carried out is somewhere near the temperature at which the catalyst is to be employed in a condensation reaction. If there is a precipitate formed, it may be readily filtered from the solution. However, where the catalyst is prepared at temperatures below room temperature, as, for example, 40° F., and where a subsequent alkylation reaction is carried out at substantially the same temperature, the above-mentioned precipitate does not usually appear and there is no need for filtering the catalyst prior to its introduction into the alkylation reaction. By bubbling in boron trifluoride into the hydrocarbon-free catalyst phase, it is possible to attain a supersaturated solution of the trifluoride in the liquid catalyst. This is ordinarily a preferred mode of operation where the catalyst composition will ultimately be employed in a reaction operating under a superatmospheric pressure. Little point is seen in so operating otherwise unless it is desired to have an excess of boron trifluoride present as such in the reaction.

The reactivation processes herein outlined may be employed with respect to partially or completely deactivated boron trifluoride-water compositions in general. The process for increasing the reactivation of these partially or completely deactivated compositions may be carried out in continuous manner or in batchwise operation, whichever is desired. No particular apparatus is required for carrying out the reactivation. Any suitable apparatus at hand which has heretofore been employed in chemical reactions, such as, for example, pressure bombs, autoclaves, or other types of closed reaction chambers suitable for handling vapors, may be employed.

In order to provide intimate contact and to effect complete separation, it is desirable to maintain some type of agitation means while the boron trifluoride is being evolved from the partially deactivated catalyst. This is desirable also in order to minimize the heat of reaction, thereby tending to avoid the decomposition of portions of the deactivated feed stock. However, of course it is well known that in the separation of the hydrocarbon phase from the catalyst phase quiescence is desired.

The following examples illustrate the method of reactivating the spent catalyst, the source of the spent catalyst, the character of the separation involved in the purification of the catalyst from the organic contaminants and a method of reusing the reactivated catalyst in alkylation reactions. It will be distinctly understood, however, that the invention is not to be limited specifically to the details of these examples.

Example 1

A catalyst prepared by substantially completely saturating water with boron trifluoride at room temperature was employed in the polymerization of ethylene to produce a normally liquid oil. The polymerization reaction was carried out at a temperature of about 70° F. The catalyst composition was employed for a period of about 2½ hours.

This partially deactivated catalyst mass was then subjected to the following procedure: 50 cc., which amounted to 828 grams, of this partially deactivated catalyst was gradually heated under reflux until no further quantities of boron trifluoride were evolved under the refluxing temperature. By this treatment the resultant catalyst mass was stratified and the aqueous layer was separated from the hydrocarbon layer and saturated with boron trifluoride at about 70° F. The 510 grams of aqueous layer which contained the catalyst took up under these conditions about 355 grams of boron trifluoride. This reactivated catalyst was then employed in the alkylation of isopentane with diisobutylene as described in Example 2.

Example 2

About 450 grams of isopentane was mixed with 865 grams of the reactivated catalyst prepared in Example 1. This mixture was then intensively agitated and over a period of about 40 minutes there was slowly added about 117 grams of diisobutylene. After all of the diisobutylene had been added, the reactant mixture was agitated for an additional twenty minutes. The temperature of the reaction was maintained between about 65 and 70° F. At the end of the addition, the product was isolated by distillation and was found to amount to about 301.4 grams of a normally liquid saturated hydrocarbon each molecule of which contained more than 6 carbon atoms. The yield based upon the total diisobutylene added to the reaction mixture was about 261% by weight. Of the product recovered, about 75.4% by weight boiled within the $C_6$–$C_9$ boiling range and was substantially completely saturated in character.

Under identical reaction conditions, amount of reactants, method of operation, etc., except that the catalyst employed was the partially deactivated boron trifluoride-water mixture, which was originally treated as described in Example 1, but which had not been subjected to the process for increasing its activity, the yield of $C_6$ and heavier saturated hydrocarbons amounted to only 202% by weight based upon the total olefins charged to the reaction mixture, and of this product recovered about 57% by weight represented that portion boiling within the $C_6$–$C_9$ boiling range. The product was likewise substantially completely saturated in character.

Example 3

The catalyst employed as a feed stock in Example 1 was subjected to varying temperatures in a staged reflux to determine the amount of boron trifluoride necessary to be evolved before the body of the catalyst would stratify. When the temperature of the liquid was about 160° F., the boron trifluoride first was evolved. At about 204° F., approximately 16 grams of boron trifluoride had been evolved. At 200–274° F., about 64 grams total of boron trifluoride had been evolved, and at this point there was a slight indication of a hydrocarbon layer separation being started. At 275–305° F., a total of about 90 grams of boron trifluoride had been evolved and the liquid reflux began to operate. It was also noted that approximately 50% of the total organic contaminants in the partially deactivated catalyst mass had separated. At a temperature of between about 305 and 323° F. a total of 114.5 grams of boron trifluoride had been evolved and it was indicated that at that temperature no further amounts of boron trifluoride would have to be evolved since all the organic contaminants had stratified from the catalyst mass. The catalyst which was subjected to the reflux treatment to evolve the free boron trifluoride contained approximately 3.45% by weight of organic contaminants. At the conclusion of the run the organic phase was separated and was found to amount to about 3.2% by weight of the total charge. From these results it would seem that in order to bring about an effective separation of the organic contaminants from the partially or completely deactivated catalyst it is desirable to evolve as much of the free or readily evolvable boron trifluoride as is possible while at the same time avoiding any substantial carbonization or charring of the organic contaminants contained in the catalyst mass.

Example 4

A partially deactivated boron trifluoride-water alkylation catalyst mass was obtained as follows: Boron trifluoride was bubbled into water at room temperature and atmospheric pressure until the composition of the solution amounted to about 78.5% by weight of boron trifluoride and about 21.5% by weight of water. This catalyst was then employed in the alkylation of isobutane with ethylene. The temperature of the reaction was maintained at between about 70° F. and about 80° F. and the ethylene was added slowly in a semi-batch type operation. During the running of this catalyst for about a total of 75 hours a total of about 950 grams of boron trifluoride was added over three substantially equal spaced intervals of time with, roughly, one third of this total amount of added boron trifluoride being added each time. However, at the end of 75 hours of running without any further treatment, the catalyst was removed from the isobutane-ethylene alkylation reaction. At the end of the 75 hours of operation the catalyst still was able to effect a yield of about 200% of $C_5$ and heavier alkylate based on the total ethylene added for the specified period between product removal times.

686.5 grams of this partially deactivated alkylation catalyst was charged to a receiver at the bottom of a reflux column. The catalyst mass was then heated under reflux with an initial point at which evolution of boron trifluoride started between about 100–110° F. and with the starting of reflux at about 213° F. The boron trifluoride was evolved with a gradually increasing temperature until the temperature of the liquid in the container at the bottom of the reflux column was about 300° F., at which time the operation was suspended. A total of about 178.5 grams of boron trifluoride was evolved and the liquid catalyst layer amounted to 422.5 grams and the organic contaminant layer amounted to about 54.5 grams. It is to be noted that the material balance could not be accurately checked in this experiment for the reason that no precaution was taken to collect or measure the amount of ethylene which was contained in the catalyst mass by reason of its usage in the alkylation reaction involving the use of ethylene as one of the reactants. Considerable quantities of ethylene were noted in the exit gas during the evolution of boron trifluoride from the catalyst mass. The boron trifluoride evolved during the treatment of the partially deactivated catalyst mass was collected in water so that accurate measurement of the amount of boron trifluoride evolved was made possible. Upon separation of the organic contaminant layer, the catalyst layer was then saturated with boron trifluoride at about 70° F. under atmospheric pressure and it was found to absorb about 165 grams of boron trifluoride. The composition was then roughly that of the original boron trifluoride-water catalyst.

*Example 5*

About 583 grams of the reactivated catalyst described in Example 4 was admixed with about 335.5 grams of isopentane. This mixture was vigorously agitated and over a period of about 40 minutes, while maintaining the mixture at a temperature of about 65° F., 85 grams of diisobutylene were slowly added. At the conclusion of the addition of the diisobutylene the reaction mixture was vigorously agitated for an additional 20 minutes. The product boiling above $C_6$ was recovered and admixed with the product recovered from the next successive run with the same catalyst which was conducted under substantially identical conditions using the same reactants in substantially the same amounts and carrying out the run in substantially an identical manner. The products constituted about 950.5 grams of $C_6$ and heavier hydrocarbon which was substantially completely saturated in character. The amount of $C_6$ and heavier hydrocarbon recovered from both experiments based upon the total diisobutylene added during the runs was about 250% by weight. Of this product, 66.3% by weight constituted the $C_6$–$C_9$ fraction which had a bromine number of 0, indicating complete saturation.

Another run was made employing as a catalyst the product which was employed as the feed stock in Example 4. This partially deactivated boron trifluoride-water catalyst was employed in a run conducted substantially identical with that outlined in Example 5 except for the catalyst substitution. The product obtained of $C_6$ and heavier substantially completely saturated hydrocarbon amounted to about 208% by weight based on the total diisobutylene charged to the reactor of which about 52.1% constituted a $C_6$–$C_9$ fraction.

*Example 6*

Another run was made in which the partially deactivated boron trifluoride-water catalyst employed as a feed stock in the reactivation process disclosed in Example 4 was directly saturated with boron trifluoride under alkylation reaction conditions such as described in Example 5. This catalyst was employed in place of the catalyst used in Example 5, all of the other reaction conditions, reactants, etc., being substantially identical with that disclosed in the first experiment of Example 5. The yield of substantially completely saturated hydrocarbon having at least 6 carbon atoms per molecule amounted to about 221% by weight based on the total diisobutylene added to the reaction. Of this product, the $C_6$–$C_9$ fraction constituted about 57.2% by weight. It had a bromine number of about 0.

This experiment accurately illustrates the desirability of first removing the organic contaminants from the partially deactivated catalyst prior to the introduction of boron trifluoride therein. The increased yields result chiefly from the removal of the organic contaminants followed by the introduction of boron trifluoride to the saturation point.

Having now fully described and illustrated the objects and nature of the invention, what is claimed as new and useful and desired to be secured by Letters Patent is:

1. A process for increasing the activity of a boron trifluoride-water condensation catalyst containing organic impurities but whose effective amount of boron trifluoride is at least 55 weight %, which comprises subjecting at least a partially deactivated boron trifluoride-water catalyst of said type to heat only sufficient to volatilize off enough boron trifluoride to effect a substantial separation of the residue into a catalyst layer and a hydrocarbon layer, removing the hydrocarbon layer and introducing boron trifluoride into the catalyst layer in such amount as to produce a catalyst substantially equivalent in chemical composition to that originally employed in organic condensation reactions.

2. A process as in claim 1 wherein the temperature for evolving boron trifluoride from the partially deactivated catalyst mass is maintained between about room temperature and about 300° F.

3. A process for increasing the activity of at least a partially deactivated boron trifluoride-water alkylation catalyst containing organic impurities whose effective boron trifluoride concentration is between about 60 and about 78 weight %, which comprises volatilizing off boron trifluoride only until a substantial separation of the catalyst mass into a hydrocarbon layer and a catalyst layer is effected, separating the layers and saturating the catalyst layer with boron trifluoride under alkylation reaction conditions.

4. A process as in claim 3 wherein the partially deactivated catalyst had become deactivated in a previous polymerization reaction.

5. A process as in claim 3 wherein the partially deactivated catalyst had been used in a polymerization reaction and wherein the reactivated catalyst is employed as an alkylation catalyst.

6. A process for the production of normally liquid saturated branched chain hydrocarbons which comprises condensing at least one isoparaffin containing at least one tertiary carbon atom per molecule with at least one mono-olefin under alkylation reaction conditions in the presence of a catalyst mass prepared by volatilizing off boron trifluoride from at least a partially deactivated boron trifluoride-water organic condensation catalyst mass containing organic impurities and containing the equivalent of between about 60 and about 78% by weight of boron trifluoride, only to such an extent as to effect substantial separation of the mass into a hydrocarbon layer and a catalyst layer, separating the layers from one another and substantially saturating the catalyst layer with boron trifluoride under alkylation reaction conditions.

7. The process which comprises gradually heating with reflux a boron trifluoride aqueous solution catalyst composition which is at least partially spent for effecting organic condensation reactions until a stratification occurs, separating a hydrocarbon layer and saturating the aqueous layer with boron trifluoride.

8. A process as in claim 7 wherein the product therefrom is employed as a catalyst for reacting isopentane with diisobutylene at a temperature between about 65° F. and about 70° F. for about one hour with intensive agitation of the reaction mixture during the reaction and separating a normally liquid branched chain, substantially completely saturated hydrocarbon mixture from the reacted mixture.

9. A process which comprises heating under reflux at atmospheric pressure a deactivated catalyst composition of boron trifluoride-water which had previously been employed as the activating agent in alkylating isobutane with ethylene until the deactivated catalyst composition stratifies, separating the organic carbonaceous layer from the aqueous layer, introducing brown trifluoride into the aqueous layer under alkylation reaction conditions for reaction of isobutane with ethylene until the layer is substantially saturated with boron trifluoride.

10. A process as in claim 9 wherein the resulting reactivated catalyst composition is employed for activating the alkylation of isoparaffin with ethylene under alkylation reaction conditions.

FRED J. BEYERSTEDT.